(12) United States Patent
Golubkov

(10) Patent No.: US 11,094,978 B2
(45) Date of Patent: Aug. 17, 2021

(54) BATTERY SYSTEM

(71) Applicant: Samsung SDI Co., Ltd., Yongin-si (KR)

(72) Inventor: Andrej Golubkov, Graz (AT)

(73) Assignee: Samsung SDI Co., Ltd., Yongin-si (KR)

(*) Notice: Subject to any disclaimer, the term of this patent is extended or adjusted under 35 U.S.C. 154(b) by 52 days.

(21) Appl. No.: 16/345,990

(22) PCT Filed: Sep. 28, 2017

(86) PCT No.: PCT/KR2017/010829
§ 371 (c)(1),
(2) Date: Apr. 29, 2019

(87) PCT Pub. No.: WO2018/084439
PCT Pub. Date: May 11, 2018

(65) Prior Publication Data
US 2020/0058973 A1 Feb. 20, 2020

(30) Foreign Application Priority Data

Nov. 4, 2016 (EP) .................................... 16197347
Sep. 21, 2017 (KR) ........................ 10-2017-0121859

(51) Int. Cl.
*H01M 10/6563* (2014.01)
*H01M 10/613* (2014.01)
(Continued)

(52) U.S. Cl.
CPC ..... *H01M 10/6563* (2015.04); *H01M 10/613* (2015.04); *H01M 10/6551* (2015.04);
(Continued)

(58) Field of Classification Search
CPC ........... H01M 10/6563; H01M 10/613; H01M 10/6551; H01M 2/1077; H01M 2/1264;
(Continued)

(56) References Cited

U.S. PATENT DOCUMENTS

| 4,207,387 A | 6/1980 | Jutte |
| 9,627,663 B2 | 4/2017 | Kim |

(Continued)

FOREIGN PATENT DOCUMENTS

| CN | 103855343 A | 6/2014 |
| EP | 1 727 223 A1 | 11/2006 |

(Continued)

OTHER PUBLICATIONS

Extended European Search Report for European Patent No. 16197347.4, dated Mar. 14, 2017, 10pp.

(Continued)

*Primary Examiner* — Lisa S Park
(74) *Attorney, Agent, or Firm* — Lewis Roca Rothgerber Christie LLP

(57) ABSTRACT

The present invention relates to a battery system including at least one aligned battery cell arranged along a first direction. Each of aligned battery cells includes a battery case in which an electrode assembly is accommodated, a cap assembly disposed in the battery case, and a vent hole provided in the cap assembly. The battery system further includes a battery system cover for covering the aligned battery cells. The battery system cover includes at least one ridge portion disposed on a lower surface thereof to face the aligned battery cells. The ridge portion extends along the first direction to be aligned with the vent holes formed in the aligned battery cells, and the ridge portion deflects the gas ejected from the vent holes along a second direction that is substantially perpendicular to the first direction. The gas (Continued)

ejected from the battery cells is distributed away from the adjacent cells disposed along the first direction so that the battery system may reduce the risk of thermal runaway propagation.

16 Claims, 6 Drawing Sheets

(51) Int. Cl.
| | | |
|---|---|---|
| *H01M 10/6551* | (2014.01) | |
| *H01M 2/10* | (2006.01) | |
| *H01M 2/12* | (2006.01) | |
| *H01M 50/20* | (2021.01) | |
| *H01M 50/30* | (2021.01) | |
| *H01M 50/271* | (2021.01) | |
| *H01M 50/55* | (2021.01) | |
| *H01M 50/35* | (2021.01) | |

(52) U.S. Cl.
CPC ......... *H01M 50/20* (2021.01); *H01M 50/271* (2021.01); *H01M 50/30* (2021.01); *H01M 50/35* (2021.01); *H01M 50/394* (2021.01); *H01M 50/55* (2021.01)

(58) Field of Classification Search
CPC ........... H01M 2220/20; H01M 10/625; H01M 10/647; H01M 10/6556; H01M 10/6554; H01M 2/1252; H01M 50/35; H01M 50/367; H01M 50/30; Y02E 60/10
See application file for complete search history.

(56) References Cited

U.S. PATENT DOCUMENTS

| | | |
|---|---|---|
| 2005/0208344 A1 | 9/2005 | Tan |
| 2010/0276120 A1 | 11/2010 | Takagi |
| 2012/0114993 A1 | 5/2012 | Park et al. |
| 2012/0225335 A1* | 9/2012 | Naito .................. H01M 50/342 429/82 |
| 2014/0154541 A1* | 6/2014 | Asakura ................ H01M 2/023 429/82 |
| 2014/0322566 A1* | 10/2014 | Kim .................... H01M 2/1016 429/56 |
| 2014/0335386 A1 | 11/2014 | Ikeya et al. |
| 2015/0017496 A1 | 1/2015 | Kim |

FOREIGN PATENT DOCUMENTS

| | | |
|---|---|---|
| KR | 10-2012-0049020 A | 5/2012 |
| KR | 10-2012-0081198 A | 7/2012 |
| KR | 10-2014-0127743 A | 11/2014 |
| KR | 10-2015-0007744 A | 1/2015 |
| KR | 10-1574081 B1 | 12/2015 |

OTHER PUBLICATIONS

Chinese Office Action (English Translation Included); Application Serial No. 201780067953.1, dated Apr. 29, 2021, 22 pages.

* cited by examiner

BATTERY SYSTEM

CROSS-REFERENCE TO RELATED APPLICATION(S)

This application is a National Phase Patent Application of International Patent Application Number PCT/KR2017/010829, filed on Sep. 28, 2017, which claims priority to European Patent Application No. 16197347.4, filed Nov. 4, 2016, and Korean Patent Application No. 10-2017-0121859, filed Sep. 21, 2017. The entire contents of all of which are incorporated herein by reference.

TECHNICAL FIELD

The present invention relates to a battery system, and more particularly to a battery system including a battery cover configured to prevent thermal runaway propagation.

BACKGROUND ART

A rechargeable battery differs from a primary battery, which only performs non-reversible conversion from chemical energy into electrical energy, in that it can repeatedly perform charging and discharging. Low-capacity rechargeable batteries can be used as power sources for small electronic devices such as mobile phones, laptop computers, and camcorders, and high-capacity rechargeable batteries are used as power sources for driving motors such as for hybrid vehicles.

Generally, a rechargeable battery includes an electrode assembly that includes a positive electrode, a negative electrode, and a separator interposed between the positive electrode and the negative electrode, a case for accommodating the electrode assembly therein, and an electrode terminal electrically connected to the electrode assembly. An electrolyte solution is injected into the case such that charging and discharging of the rechargeable battery can take place through an electrochemical reaction of the positive electrode, the negative electrode, and the electrolyte solution. The case may be cylindrical or rectangular depending on the purpose and use of the case.

The rechargeable battery may use a battery module formed of a plurality of unit cells connected in series and/or in parallel so as to drive a motor of a hybrid vehicle that requires high energy density. That is, the battery module is formed by connecting electrode terminals of the battery cells to each other, and the rechargeable battery having high power for driving a motor of an electric vehicle, for example, may be implemented by connecting electrode terminals of a plurality of unit cells conforming to a required amount of the electrical power to each other.

The battery module may be implemented in either a block or modular manner. In the block manner, each of the battery cells is coupled to a common power collecting structure and a common battery management system, and is disposed within the housing. In the module manner, some of the battery cells are connected to a submodule, and some submodules are connected to constitute a module. A battery management function may be implemented at least partially for a module or sub-module level, thereby improving compatibility. To form a battery system, one or more battery modules may be equipped with a thermal management system to be mechanically and electrically integrated, so as to be in communication with one or more electrical consumption devices.

The battery system needs to properly mechanically connect constituent elements (e.g., connection between battery submodules and connection with an electrical consumer device such as a car) in order to achieve mechanical integration. Such a connection structure is required to be implemented such that an average cycle-life of the battery system and the functionality and safety during use of the electrical consumption devices are maintained. In addition, installation space and compatibility requirements should be considered, especially in mobile applications.

A carrier plate (e.g., a ground plate) may be provided, and each battery cell or submodule may be disposed thereon, to achieve mechanical integration of the battery module. Fixing of the battery cells or submodules to the carrier plate may be achieved by fixing it in a recessed space of the carrier plate, mechanically connecting it with a bolt or a screw, or inserting the battery cell or submodule. A method of inserting may be such that a side plate of the battery is fastened to a side of the carrier plate, or subsequently another carrier plate is provided at an upper portion thereof to fix it to the carrier plate and/or the side plate disposed at a lower portion. As a result, the battery module may be installed in a multi-layered structure, and the carrier plate and/or the side plate may include a coolant duct so as to cool the battery cells or submodules.

A mechanically enhanced electrical connector may be provided, or an electrical connector may be secured to a carrier beam or a strut member together with the battery cells so as to mechanically integrate the battery submodules. In addition, the battery submodules may be disposed in a case that partially or entirely covers surfaces of the submodules so as to be provided within the battery module, e.g., at an upper portion of the carrier plate.

For the battery module implemented in the modular manner, the submodules, each of which includes a plurality of battery cells connected in parallel to each other, are connected to each other in series (XsYp), or the submodules, each of which includes a plurality of battery cells connected to each other in series, are connected in parallel (XpYs), in order to obtain an electrically integrated structure. The submodules having such a connection type XsYP may accomplish high power, but may be required to individually control voltages of the battery cells, which leads to an increase in wiring complexity. In contrast, the voltages of the battery cells are automatically balanced in the submodules having such a connection type XpYs. Therefore, since the wiring complexity of the XpYs submodule is reduced, it is sufficient that voltage control is performed at a submodule level. In the submodules including the cells connected in parallel, capacitances of the cells are summed, and thus the submodules of the connection type XpYs are mostly used for low-capacity cells.

A static control method for power output and charging may not be sufficient to satisfy various power requirements of various electrical consumption devices connected to the battery system. The battery system needs to be implemented to perform a continuous information exchange between the battery system and controllers of the electric consumption devices. For the information exchange of the battery system, it is possible to communicate, e.g., the actual or predicted required power of surplus battery consumption devices, as well as an actual state of charge (SoC) of the battery system, potential electrical performance, charging capability, and internal resistance. The battery system typically includes a battery management system to process such information.

A battery thermal management system may cool a rechargeable battery by efficiently releasing, discharging, and/or dissipating heat generated from the rechargeable battery for safe use of the battery module.

When the heat generated in the battery is not sufficiently released, discharged, and/or dissipated, a temperature deviation occurs between battery cells, so that one or more battery modules may not generate a desired amount of electric power. In addition, when an internal temperature of the rechargeable battery rises, it may lead to an abnormal internal reaction, thereby degrading the charge/discharge performance of the rechargeable battery and shortening the cycle-life of the rechargeable battery. Therefore, a cooling device for efficiently releasing, discharging, and/or dissipating heat generated in the cells is required.

An abnormal operating condition of the rechargeable battery is, e.g., thermal runaway of the battery cells, which may be caused, for example, by an overheated or overcharged lithium ion cell. A threshold temperature for thermal runaway is typically above 150° C., and it may be caused by a failure or an error such as an internal short circuit of the cells, poor electrical contact, or a short circuit with adjacent cells. The thermal runaway is a phenomenon in which a large amount of heat and gas are produced by a chemical reaction inside a cell, accelerating itself until all materials are consumed. During the thermal runaway, a cell that is operating abnormally may be heated to a temperature of 700° C. or higher, and a high temperature gas may be discharged to a battery system in a large amount. Thus, a large amount of heat may be discharged into adjacent cells. The adjacent cells may receive heat conducted through the side plate, the base plate, or the electrical connector, which facilitates further thermal runaway. In other words, such convective heat transfer to adjacent battery cells increases the risk of thermal runaway by a plurality of spaced-apart battery modules. As a result, the thermal runaway may propagate throughout the battery module, leading to ignition of the battery and/or total loss of the electric vehicle.

According to the prior art, the battery system may include a compartmented exhaust chamber for receiving the discharged gas in order to, e.g., prevent the gas discharged by a check valve from flowing back to a section where the battery cells are disposed, or prevent the gas from flowing into the compartment. However, the exhaust chamber typically requires additional space, thereby reducing energy density of the battery system.

DISCLOSURE

Technical Problem

The present invention has been made in an effort to provide a battery system that ameliorates the discharge of a high temperature gas from battery cells and improves protection against propagation of abnormal operating conditions such as thermal runaway through the battery cells by overcoming or alleviating at least some of the drawbacks according to a conventional art.

Technical Solution

Exemplary embodiments of the present invention will be described in detail with reference to the accompanying drawings, claims, and/or the following description of the attached drawings, which are to be easily understood by those skilled in the art to which the present invention pertains. The present invention may be modified in various different ways, but is not limited thereto.

An exemplary embodiment of the present invention provides a battery system including at least one or a plurality of aligned battery cell arranged along a first direction. Each of the battery cells includes an electrode assembly accommodated in a battery case, and a cap assembly is disposed in the battery case to seal the battery case. A vent hole is provided inside the cap assembly, and the vent hole is configured to discharge gas when the battery cell is in abnormal operation such as thermal runaway. In addition, a battery system cover for covering the aligned battery cells is provided. That is, the battery system cover may be provided to seal the battery system.

According to the present invention, the battery system cover includes at least one ridge portion facing the battery cells arranged and aligned on a lower surface thereof. That is, said at least one ridge portion protrudes downward from the lower surface of the battery system cover. The ridge portion extends along the first direction y to align with the vent holes formed in the aligned battery cells. The ridge portion is configured to deflect a gas ejected from the vent holes along a second direction x that is substantially perpendicular to the first direction y. Preferably, the second direction forms an angle of 85 to 95 degrees with the first direction y. More preferably, the first direction y and the second direction x are perpendicular to each other.

That is, the present invention provides an improved battery system cover, which includes the ridge portion forming a geometry for deflecting gas in a different direction from a direction in which the battery cells are arranged (the first direction). The battery cells arranged in an alignment direction in the battery system may be in direct contact with each other, and may be disposed in a shorter distance than that of the battery cells that are not arranged in the alignment direction. Heat transfer between the battery cells arranged in the alignment direction occurs through direct contact of the adjacent battery cells or through the base plate or an electrical interconnector such as a metal bus bar. The heat transfer between the battery cells adjacent in the alignment direction is particularly high due to the small distance between the battery cells arranged in the alignment direction.

In general, a phenomenon of discharging gas from the battery cells refers to an abnormal operation state, and the gas is discharged from the battery cells at a high temperature and a high speed. In the case of the battery cells having high energy density, e.g., about 200 Wh/kg, the gas temperature is usually 700° C. and the gas velocity is 300 m/s. Thus, the discharged gas jet is discharged by the vent holes of the battery cells, and flows toward a space above the vent holes. When the battery system cover is disposed over the vent holes of the battery cells, the cover deflects the gas. A typical battery system cover deflects a gas uniformly in all directions so that a significant amount of the high temperature gas may be deflected toward the adjacent battery cells that are aligned together with the abnormal battery cells along the alignment direction of the battery cells from the battery system cover. In addition, convective heat transfer by the high temperature gas also adds an additional thermal burden to the adjacent cells, which are already at risk, thereby increasing the risk of thermal runaway propagation.

According to the present invention, the discharged gas is deflected in a different direction substantially perpendicular to the alignment direction, and is deflected toward the battery cells which are not aligned with the abnormal battery cell, that is, the battery cells which do not make direct contact with the abnormal battery cells. As a result, an amount of exhaust gas which is in contact with the adjacent cells arranged in the same alignment direction as the abnormal battery cells and thermal load are reduced, and the thermal energy of the battery system is entirely uniformly distributed. Thanks to the uniform thermal energy distribution of the battery system, the cells adjacent to the abnormal battery cells in the alignment direction may always stay below the threshold temperature, thus reducing the thermal runaway propagation. In addition, the battery system cover, which is in contact with the gas jet discharged from the vent holes, has increased melting resistance against the thickness. Thus, the risk of burning the cover is reduced, and mechanical stability and robustness to pressure are increased.

In accordance with the battery system according to an exemplary embodiment of the present invention, the vent holes of the aligned battery cells are aligned in the first direction. That is, all of the vent holes for the aligned battery cells are arranged in a straight line or a substantially straight line. The ridge portion extends substantially parallel to the straight line to be aligned with the vent holes. More preferably, said at least one ridge portion is spaced apart from the vent holes in a third direction that is substantially perpendicular to the first direction and the second direction. Particularly preferably, the first direction and the second direction are on the x-y plane, and the third direction corresponds to the height of the z direction or the x-y plane. That is, said at least one ridge portion is disposed above the vent holes. As a result, a space is ensured between the cover and the battery cells for convection of gas along the direction perpendicular to the first direction. Hereinafter, the ridge portion arranged or aligned in the battery cells indicates the battery system cover which covers the battery cells aligned in the battery system, e.g. the system cover prepared at an installation position through a facility.

In accordance with the battery system according to a characteristic exemplary embodiment of the present invention, said at least one ridge portion is tapered gradually toward the battery cell in the cross-section along the second direction. In other words, the ridge portion becomes wider as the cross-section of the ridge portion perpendicular to an extending portion in the longitudinal direction is closer to the flat upper portion of the battery system cover, and becomes gradually narrower as the distance increases. Therefore, the tip of the ridge portion is directed to the inside of the battery system and the battery cells, particularly, the vent holes of the battery cells arranged immediately below. The ridge portion includes a first ridge side portion and a second ridge side portion extending from the tip toward the flat upper portion of the battery system cover. An angle may be formed between the first ridge side portion and the second ridge side portion, and they may meet at the tip of the ridge portion.

More preferably, the first ridge side portion is configured to deflect the gas ejected from the vent holes in the second direction, and the second ridge side portion is configured to deflect the gas ejected from the vent holes in an opposite direction to the second direction. As a result, the exhausted gas is separated from the ridge portion, and some of the gas is deflected in opposite directions. Accordingly, the amount of convection heat transferred to each side of the aligned battery cells is reduced and distributed to a greater number of the battery cells. Particularly preferably, the ridge portion is formed to have a substantially triangular cross-section along the second direction. The cross-sectional portion may form a substantially trapezoidal shape. More preferably, each of the first ridge side portion and the second ridge side portion has a concave cross-section along the second direction. In particular, the concave side portion may form a triangle in which a lowermost edge of the triangle forms the tip of the ridge portion. Deflection and redirection of the discharged gas may have almost no force when transferred from the gas jet to the cover, and may be smooth by providing a concave shape to the side portion.

According to another exemplary embodiment of the present invention, the ridge portion is further configured to cool the gas discharged from the vent holes of the battery cells. The ridge portion is a first element of the battery system that is struck by the gas jet. Thus, cooling the gas jets in the ridge portion may further reduce the amount of heat being distributed across the battery system. Preferably, the ridge portion is configured to cool the exhaust gas from the vent holes by including at least one coolant duct, i.e., a hollow portion attached to or disposed at said at least one ridge portion, to carry the coolant. Said at least one ridge may further include a coolant port for supplying a coolant to the coolant duct. In addition, said at least one ridge portions and/or the battery system cover are made of a material having high thermal conductivity, preferably a metal, and in another exemplary embodiment, a heat sink is disposed at an upper portion of the battery system cover facing said at least one ridge portion. By this means, the thermal mass of the cover and the ridge portion may be increased and heat may be effectively discharged from the exhaust gas.

According to another embodiment of the present invention, the battery system includes a plurality of battery modules spaced apart from each other in the second direction, and preferably, each of the battery modules includes a plurality of battery cells arranged along the first direction. The battery system further includes a battery system cover having a plurality of ridge portions disposed separately from each other in the second direction. Each of the ridge portions extends in the first direction, and is aligned with one of the battery modules, i.e., the vent holes of the aligned battery cells of the battery module. Thus, each of the ridge portions is configured to deflect a gas jet that is perpendicular to the longitudinal direction of the battery module from the battery cells of one of the battery modules and is ejected toward the adjacent battery module. Therefore, the thermal energy of the failed battery cell may be dispersed in the battery system. In addition, the ridge portions extending along the battery system cover provide further improved mechanical stability of the cover.

In accordance with the battery system according to an exemplary embodiment of the present invention, each of the battery cells further includes a positive terminal and a negative terminal, and the vent hole of each battery cell is disposed at a distance from the positive terminal and the negative terminal. That is, any physical contact between the at least one ridge portion and the positive terminal or the negative terminal is avoided. Therefore, there is no electrical connection between one of the positive and negative terminals and said at least one ridge portion, thereby avoiding a short circuit between the terminal and the cover. Particularly preferably, the positive terminal and the negative terminal are spaced apart from each other along the second direction, and the vent hole is disposed between the positive terminal and the negative terminal.

According to an exemplary embodiment of the present invention, the battery system further includes a housing for accommodating the battery cells, wherein the battery system cover is configured to be attached to the housing. The housing preferably includes a bottom plate which can be constituted by a bottom surface of the battery system. The bottom plate may include a cooling means for cooling the battery cells on an upper surface thereof. The housing further includes a pair of first housing sidewalls and a pair of second housing sidewalls facing each other. The side walls are attached to the bottom plate, the first housing sidewalls are respectively attached to the second housing sidewalls, and the second housing sidewalls are respectively attached to the first housing sidewalls. The battery cells and other components of the battery system, such as a battery management unit or a battery discharge unit, may be inserted into the housing through an open upper surface of the housing. The battery system cover is configured to be attached to the housing to cover the open surface of the housing. Said at least one ridge portion of the cover may be aligned with respect to the vent holes as described above, and the battery system cover is attached to the housing.

More preferably, at least one of the sidewalls surrounding the housing in the second direction includes the exhaust port for discharging the gas ejected from the vent holes and deflected from said at least one ridge portion. That is, the exhaust port is provided in a direction in which the gas is deflected by said at least one ridge portion. Thus, reliable discharge of the gas discharged from the housing is ensured.

Advantageous Effects

According to an exemplary embodiment of the present invention, the gas ejected from the battery cells of the battery system can be distributed away from the adjacent cells disposed along the first direction, thereby reducing the risk of thermal runaway propagation of the battery system.

According to another preferred embodiment of the present invention, the ridge portion is further configured to cool the gas discharged from the vent holes of the battery cells, thereby effectively discharging heat generated from the discharged gas.

DESCRIPTION OF THE DRAWINGS

The features of the present invention will become apparent to those skilled in the art from the following detailed description of various embodiments with reference to the drawings.

MODE FOR INVENTION

Figure 1:
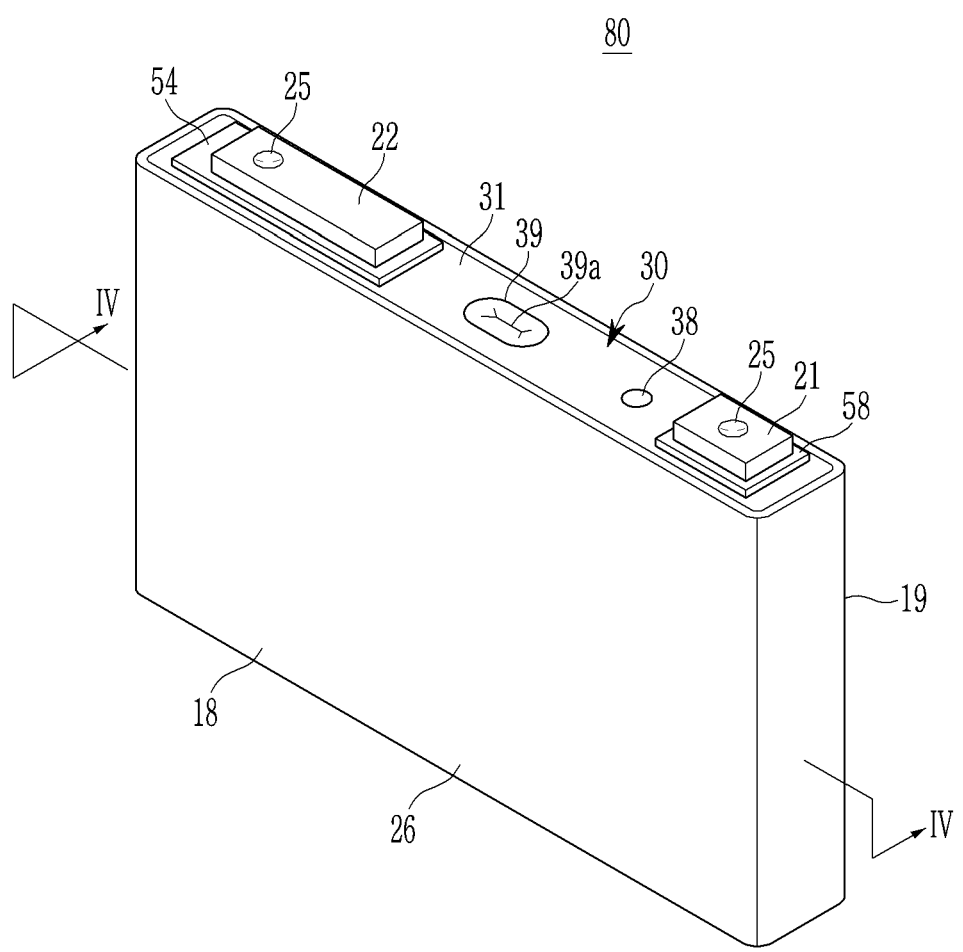
FIG. 1 illustrates a perspective view of a battery cell according to a first exemplary embodiment of the present invention.

Exemplary embodiments of the present invention will now be described in detail with reference to the accompanying drawings. The effects, features, and implementations of the exemplary embodiments will now be described with reference to the accompanying drawings. In the drawings, the same reference numerals denote the same elements, and redundant explanations will be omitted. As used in this specification, the term "and/or" includes any and all combinations of one or more related listed items. The use of "can/may" in describing an exemplary embodiment of the present invention refers to "at least one exemplary embodiment of the present invention." Although the present exemplary embodiments are described in various specific exemplary embodiments, it will be apparent to those skilled in the art that modifications may be made. All such modifications are deemed to be within the scope of the claims.

As used in this specification, the terms "substantially", "approximately", and similar terms are used as approximate terms but are not used as degree terms, and they are not intended to illustrate inherent deviations of measured or calculated values evident to those skilled in the art. In addition, when the term "substantially" is used in combination with a characteristic that can be expressed using numerical values, the term "substantially" refers to including a range of +/−5% of the value. The use of "can/may" in describing an exemplary embodiment of the present invention indicates "at least one exemplary embodiment of the present invention." Herein, the terms "upper" and "lower" are defined along the z-axis. For example, a top cover is disposed at the top of the z-axis, and a bottom cover is disposed at the bottom.

Figure 2:
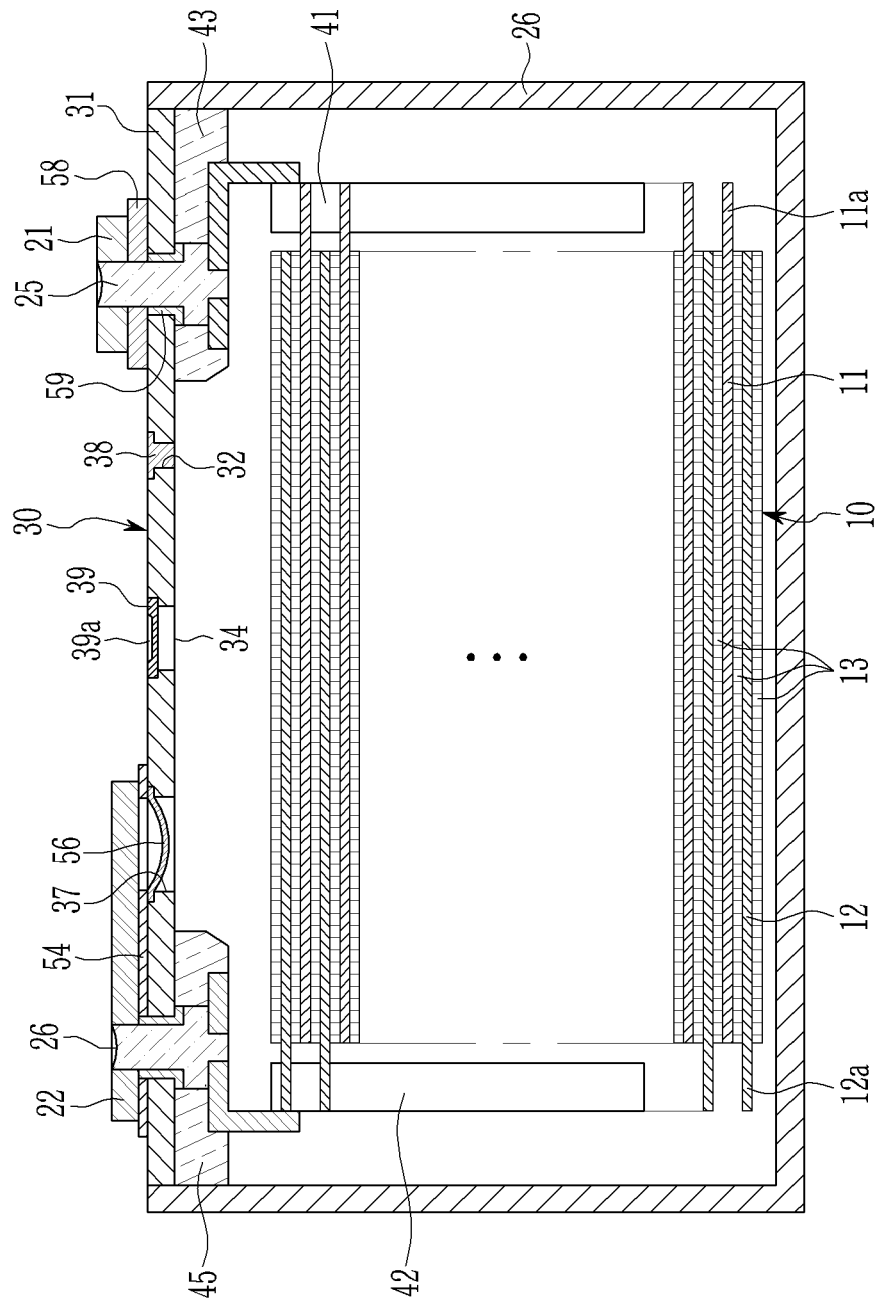
FIG. 2 illustrates a cross-sectional view of the battery cell according to the first exemplary embodiment of the present invention.

FIG. 1 illustrates a perspective view of a battery cell according to a first exemplary embodiment of the present invention, and FIG. 2 illustrates a cross-sectional view taken along a line IV-IV of FIG. 1.

Referring to FIG. 1 and FIG. 2, according to the first exemplary embodiment, a battery cell 80 includes an electrode assembly 10, and a case 26 for accommodating the electrode assembly 10 and an electrolyte solution. The battery cell 80 may include a cap assembly 30 for sealing an opening of the case 26. In the present exemplary embodiment, the battery cell 80 is exemplified as a rectangular lithium ion rechargeable battery, but the present invention is not limited thereto.

The electrode assembly 10 may be formed as a jelly-roll type of electrode assembly in which a positive electrode 11 and a negative electrode 12 are spirally wound with a separator 13 interposed therebetween. Each of the positive electrode 11 and the negative electrode 12 may include a current collector formed of a thin gold foil on which an active material is coated, and a positive electrode uncoated portion 11a and a negative electrode uncoated portion 12a at which no active material is coated on the current collector. A coated region of the positive electrode 11 may be formed, e.g., by coating an active material such as a transition metal oxide on a substrate formed of a metal foil such as aluminum. A coated region of the negative electrode 12 may be formed by coating an active material such as carbon or graphite on a substrate formed of a metal foil such as copper or nickel.

The positive electrode uncoated region 11a may be formed at one end of a longitudinal direction of the positive electrode 11, and the negative electrode uncoated region 12a may be formed at one end of a longitudinal direction of the negative electrode 12. The positive electrode uncoated region 11a and the negative electrode uncoated region 12a may be disposed at opposite sides of the coated region. The separator 13 may include a plurality of separators wound spirally together with the positive electrode 11 and the negative electrode 12 and alternately disposed between the positive electrode 11 and the negative electrode 12. The present invention is not limited thereto, and the electrode assembly 10 can be configured to have a structure including a plurality of sheets in which the positive electrode 11, the separator 13, and the negative electrode 12 are repeatedly stacked.

The electrode assembly 10 may be accommodated in the case 26 together with an electrolyte solution. The electrolyte solution may be prepared by using a lithium salt such as $LiPF_6$ or $LiBF_4$, and an organic solvent such as EC, PC, DEC, EMC, or EMC. The electrolyte solution may be in a liquid, solid, or gel state. The case 26 may be formed to have a substantially rectangular parallelepiped shape, and an opening may be formed on one surface thereof. The case 26 may be formed of a metal such as aluminum as an example.

The case 26 includes a substantially rectangular bottom surface to form a space for accommodating the electrode assembly 10 therein, and a pair of wide first case side portions 18 and 19 and a pair of second case side portions vertically connected to an end portion of the bottom surface. The first case side portions 18 and 19 may be formed to face each other, and the second case side portions may be disposed to face each other and may be connected to the first case side portions 18 and 19. A length of an edge where the bottom surface and the first case side portions 18 and 19 are connected to each other may be longer than that of an edge where the bottom surface and the second case side surface portions are connected to each other. Preferably, a first case side portion and a second case side portion which are adjacent to each other are connected at an angle of about 90 degrees.

The cap assembly 30 may include a cap plate 31 which is coupled to the case 26 to cover the opening of the case 26, and a positive terminal 21 and a negative terminal 22 that are protruded outward from the cap plate 31 to be electrically connected to the positive electrode 11 and the negative electrode 12, respectively. The cap plate 31 may have a plate shape extending in one direction to be coupled to the opening of the case 26. The cap plate 31 may include an inlet 32 and a vent hole 34 communicating with the interior of the cap assembly 30. The inlet 32 may be configured to inject an electrolyte solution, and a sealing cap 38 may be mounted on or in the inlet 32. The vent hole 34 may be provided with a vent member 39 having a notch 39a that can be ruptured by a predetermined pressure.

The positive terminal 21 and the negative terminal 22 may be mounted so as to protrude above the cap plate 31. The positive terminal 21 may be electrically connected to the positive electrode 11 through a current collecting tab 41, and the negative terminal 22 may be electrically connected to the negative electrode 12 through a current collecting tab 42. A terminal connection member 25 may be mounted between the positive terminal 21 and the current collecting tab 41 to electrically connect the positive terminal 21 and the current collecting tab 41. The terminal connection member 25 may be inserted into a hole formed in the positive terminal 21, such that a lower portion thereof may be welded to the current collecting tab 41.

A sealing gasket 59 may be inserted between the terminal connection member 25 and the cap plate 31 to be inserted into the hole of the cap plate 31 through which the terminal connection member 25 extends. Further, a lower insulating member 43 into which a lower portion of the terminal connection member 25 may be inserted may be mounted on a lower portion of the cap plate 31. A connection plate 58 for electrically connecting the positive terminal 21 and the cap plate 31 may be mounted between the positive terminal 21 and the cap plate 31. The terminal connection member 25 may be inserted into the connection plate 58. Accordingly, the cap plate 31 and the case 26 may be positively charged.

A terminal connection member 26 may be mounted between the positive terminal 22 and the current collecting tab 42 to electrically connect the positive terminal 22 and the current collecting tab 42. The terminal connection member 26 may be inserted into a hole formed in the cap plate 31 around the negative terminal 22 so that upper and lower portions of the terminal connection member 26 are respectively welded to the negative terminal 22 and the current collecting tab 42. A sealing gasket similar to the gasket 59 is inserted into the hole of the cap plate 31 through which the terminal connection member 26 extends to be mounted between the negative terminal 22 and the cap plate 31. In addition, a lower insulation member 45 may be mounted at a lower portion of the cap plate 31 to insulate the negative terminal 22 and the current collecting tab 42 from the cap plate 31.

An upper insulation member 54 for electrically connecting the negative terminal 22 and the cap plate 31 may be mounted between the negative terminal 22 and the cap plate 31. The terminal connection member 26 may be inserted into a hole formed in the upper insulation member 54. The cap assembly 30 may include a short-circuit hole 37 and a short-circuit member 56 installed in the short-circuit hole 37 to short circuit the positive electrode 11 and the negative electrode 12. The short-circuit member 56 may be disposed between the upper insulation member 54 and the cap plate 31, and the upper insulating member 54 may form a cutout at a position corresponding to the short-circuit member 56. The short-circuit member 56 may overlap the negative terminal 22 exposed through the cutout, and may be disposed separately.

The short-circuit member 56 may be disposed between the negative terminal 22 and the vent hole 34, or may be disposed closer to the negative terminal 22 than the vent hole 34. The short-circuit member 56 may include a convex curved portion curved toward the electrode assembly 10, and an edge portion formed outside the curved portion and fixed to the cap plate 31. When an internal pressure of the battery cell 80 rises, the short-circuit member 56 may be deformed and short-circuited. That is, when a gas is generated due to an unwanted reaction in the battery cell 80, the internal pressure of the cell 80 may rise. When the internal pressure of the battery cell 80 rises above a predetermined level, the curved portion of the short-circuit member 56 is concavely deformed in an opposite direction, causing a short circuit while contacting the negative terminal 22.

Figure 3:
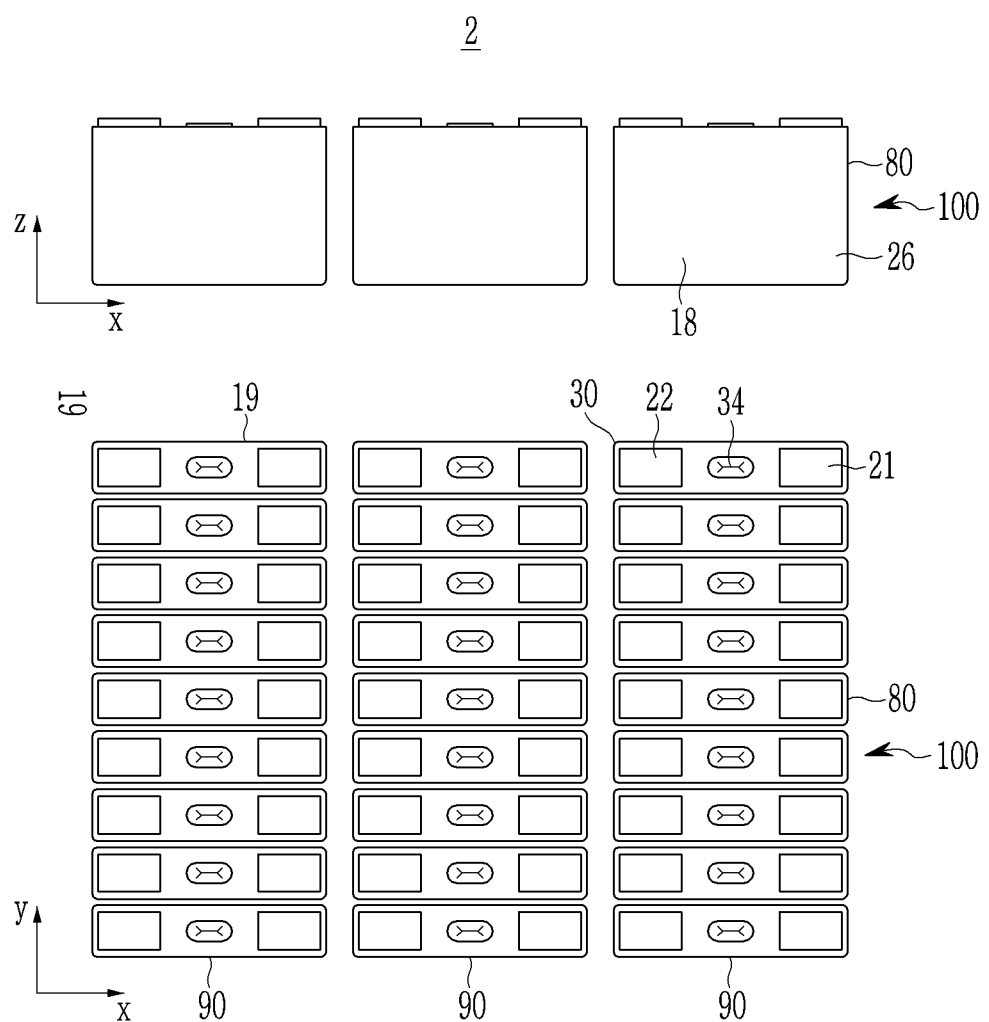
FIG. 3 illustrates a side view and a top plan view of a battery system according to the first exemplary embodiment of the present invention.
Figure 4:
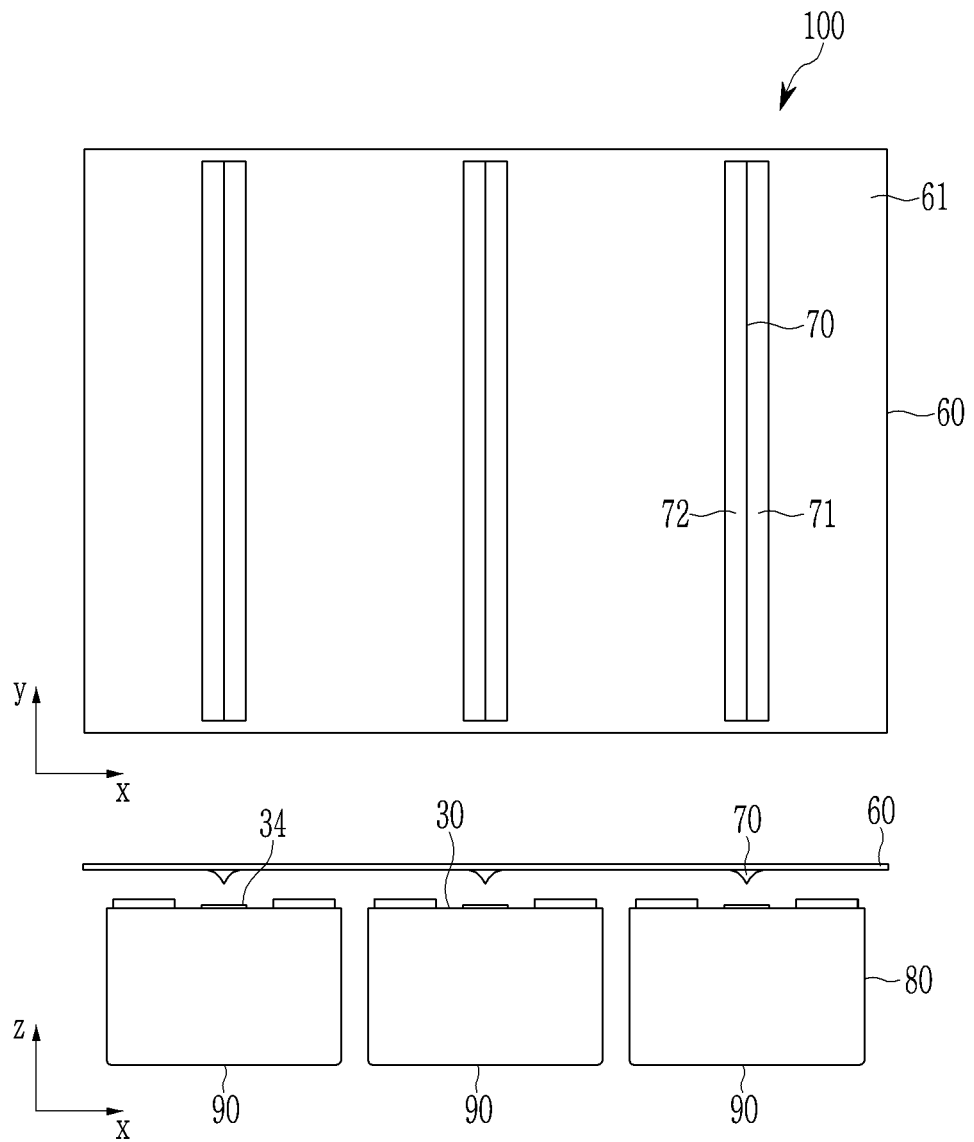
FIG. 4 illustrates a side view of the battery system and a bottom view of a battery system cover according to the first exemplary embodiment of the present invention.
Figure 5:
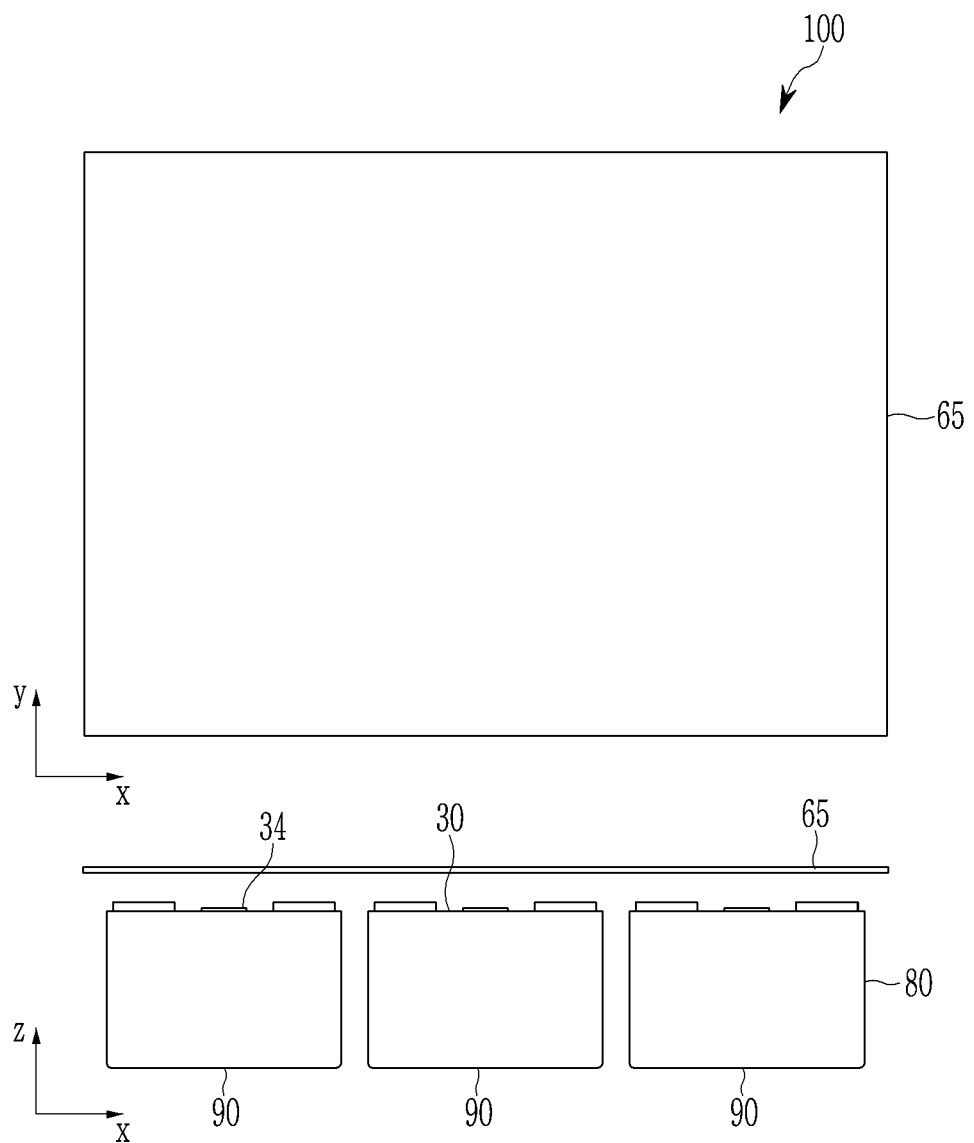
FIG. 5 illustrates a side view of a battery system and a bottom view of a battery system cover according to a conventional art.

Referring to FIG. 3 to FIG. 5, a battery system 100 includes a plurality of battery modules 90 spaced apart in a second direction x. Each of the battery modules 90 includes a plurality of battery cells 80 arranged and aligned in a first direction y. Each of the battery cells 80 is an angular (or rectangular) cell 80 that includes the case 26 and an electrode assembly (not illustrated) accommodated in the case 26. The case 26 is made of an aluminum material to have a substantially rectangular parallelepiped shape, and an opening for inserting the electrode assembly 10 is formed at an upper side thereof. Furthermore, the case 26 has wide case side portions 18 and 19 facing each other.

The wide and flat case side portions 18 and 19 of the battery cell 80 are stacked on each other to form the battery modules 90. That is, the first case side portions 18 and 19 of the neighboring battery cells 80 are arranged to face each other or to be in close contact with each other. A spacer (not illustrated) may be disposed between the first case side portions 18 and 19 of the neighboring battery cells 80. The positive terminal 21 and the negative terminal 22 of the neighboring battery cells 80 are electrically connected through a bus bar (not illustrated). The battery module 90 may be used as a power supply unit by bundling the plurality of battery cells 80 by electrically connecting them.

Each of the battery cells 80 includes the vent hole 34 disposed in the cap assembly 30 of the battery cells 80 at a distance from the positive terminal 21 and the negative terminal 22. The vent holes 34 of the plurality of battery cells 80 aligned in the first direction x are also arranged in the first direction x.

According to a conventional battery system illustrated in FIG. 5, a conventional battery system cover 65 is disposed at an upper portion of the battery module 90 such that a lower surface of the cover 65 faces the cap assemblies 30 of the battery cells 80. When thermal runaway occurs in one of the battery cells 80, a high temperature gas jet will be discharged at a high speed from the vent hole 34 of the corresponding battery cell 80. The gas jets which strike the conventional cover 65 are then uniformly deflected in all directions on the x-y plane. Accordingly, the gas jets are deflected toward the battery cells 80 of the battery module 90 adjacent to the battery cell 80 in which a considerable amount of heat is generated. These adjacent battery cells 80 are already heated from the thermal-runaway cell 80 due to thermal conduction, and thus thermal runaway may easily occur when they are subjected to more heat from the deflected gas jets.

In the battery system 100 according to the first exemplary embodiment of the present invention, a battery system cover 60 is disposed at an upper portion of the battery module 90 such that a lower surface 61 of the battery system cover 60 faces the cap assemblies 30 of the battery cells 80. The battery system cover 60 includes a plurality of ridge portions 70 spaced apart in a second direction x. The ridge portions 70 extend in the first direction y. That is, the length extension of each of the ridge portions 70 is set in the first direction y. Each of the ridge portions 70 is aligned with one battery module 90, i.e., vent holes 34 of a plurality of battery cells 80 arranged. The respective ridge portions 70 are arranged above the vent holes 34 of the corresponding battery module 90 at a distance from the cap assemblies 30 of the battery cells 80 of each battery module 90 in a third direction z.

As illustrated in FIG. 4, each of the ridge portions 70 has a substantially triangular cross-sectional structure in the second direction x. A tip, which is a lowermost corner of the triangular cross-section at the ridge portion 70, is aligned with and spaced apart from the vent hole 34 disposed therebelow. The ridge portion 70 includes a first ridge side portion 71 and a second ridge side portion 72 that extend from the tip to a flat upper portion of the battery system cover 60. The first ridge side portion 71 and the second ridge side portion 72 meet at a certain angle at the tip of the ridge portion 70. Each of the first ridge side portion 71 and the second ridge side portion 72 has a concave shape. The first ridge side surface portion 71 deflects the gas jet ejected from the vent hole 34 disposed therebelow in the second direction x, and the second ridge side surface portion 72 deflects the gas jet ejected from the vent hole 34 in an opposite direction −x that is opposite to the second direction.

Thus, under abnormal operating conditions, the gas jets ejected from the vent holes 34 of any battery cell 80 are separated from the respective ridge portions 70. Each separate portion of the deflected gas jet is directed toward a sidewall of each adjacent battery module 90 or a housing (not shown) of the battery system 100. Thus, the gas jet and the heat conducted therefrom are dispersed away from the battery cells 80 adjacent thereto in the same battery module 90 as the thermal-runaway battery cell 80. These adjacent battery cells 80 are already receiving heat from the thermal-runaway battery cell 80 due to heat conduction, so there is a possibility of thermal runaway thereof. However, as the heat of the gas jets is dispersed into a wider area, and particularly toward the battery modules 90 of the battery system 100 adjacent thereto, a risk of thermal runaway propagation is reduced. The gas jets ejected from the battery cell 80 of an outermost battery module 90 are partially deflected toward the housing of the battery system. The housing includes an exhaust port that is disposed at a sidewall at which the ejected gas jets are at least partially deflected in order to ensure that discharged gas is sufficiently exhausted.

Figure 6:
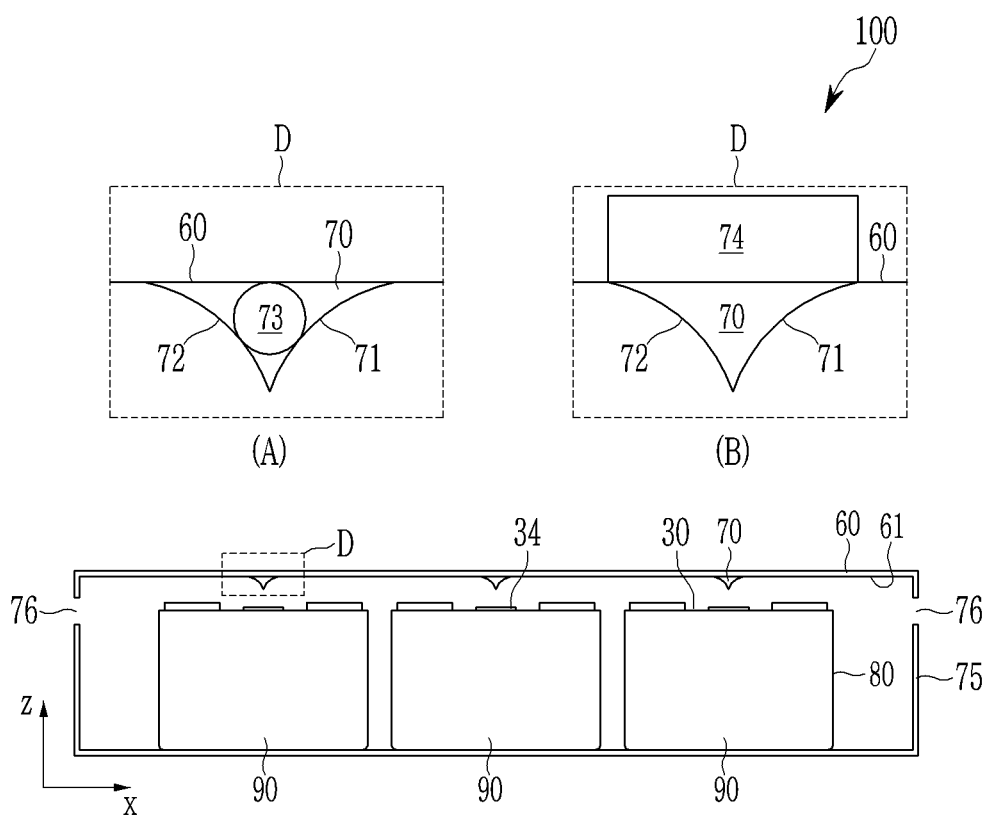
FIG. 6 illustrates a side view of a battery system and detailed views D of detailed versions A and B of a ridge portion according to a second exemplary embodiment of the present invention.

FIG. 6 illustrates a side view of the battery system 100 and detailed views of a first version A and a second version B of a ridge portion 70 according to a second exemplary embodiment of the present invention. The battery system 100 according to the second exemplary embodiment includes a battery system cover 60 that is disposed at an upper portion of a battery module 90 such that a lower surface 61 thereof faces cap assemblies 30 of a plurality of battery cells 80. The battery system cover 60 includes a plurality of ridge portions 70 spaced apart in the second direction x. Each of the ridge portions 70 extends in the first direction y. Each of the ridge portions 70 is aligned with the vent holes 34 of one battery module 90 including the plurality of arranged battery cells 80. The respective ridge portions 70 are disposed above the vent holes 34 of the corresponding battery module 90 to be spaced apart from the cap assemblies 30 of the battery cells 80 of each battery module 90 in the third direction z.

Each of the ridge portions 70 includes a substantially triangular cross-section in the second direction x. A tip, that is, a lowermost edge of the roughly triangular ridge portion 70, is separately disposed to be aligned with the vent hole 34 disposed below the ridge portion 70. The ridge portion 70 includes a first ridge side portion 71 and a second ridge side portion 72 that extend from the tip to a flat upper portion of the battery system cover 60. The first ridge side portion 71 and the second ridge side portion 72 meet at a certain angle at the tip of the ridge portion 70. Each of the first ridge side portion 71 and the second ridge side portion 72 has a concave shape. The first ridge side surface portion 71 deflects the gas jet ejected from the vent hole 34 disposed therebelow in the second direction x, and the second ridge side surface portion 72 deflects the gas jet ejected from the vent hole 34 in an opposite direction −x that is opposite to the second direction. In the battery system 100 according to the second exemplary embodiment, at least one ridge portion is configured to cool the gas discharged from the vent holes 34.

According to the ridge portion according to the first version A of FIG. 6, the ridge portion 70 includes a coolant duct 73 which is embedded in the ridge portion 70 to extend. That is, the coolant duct 73 extends in the first direction y to be aligned with the vent holes 34 of one battery module 90 in each of the ridge portions 70. The coolant duct 73 is surrounded by the first ridge side portion 71, the second ridge side portion 72, and a portion of the battery system cover 60. The coolant duct 73 may be a hollow portion within an integrated ridge portion 70, and/or a coolant pipe molded into the ridge portion 70 of the battery system cover 60. The coolant duct 73 terminates in a first coolant port (not illustrated) at a first end and ends at a second coolant port (not illustrated) at a second end. The first coolant port (not illustrated) and the second coolant port (not illustrated) of each coolant duct 73 are configured to be fluidly connected to an external coolant circuit (not illustrated).

According to the ridge portion according to the second version B of FIG. 6, a heat sink 74 is disposed on a upper surface of the battery system cover 60 facing at least one ridge portion 70. According to this modified embodiment, the ridge portion 70 and the battery system cover 60 are made of a material having high thermal conductivity, preferably aluminum. Thus, the heat generated from the discharged gas jets is efficiently transferred to the heat sink 74 through the battery system cover 60 to be dissipated by the heat sink 74. According to an exemplary embodiment, the heat sink 74 may include an extended surface area, i.e., at least one corrugated surface, or may include a plurality of ridge portions disposed on at least one surface. Optionally or additionally, the heat sink 74 may include at least one coolant duct (not illustrated) disposed within the heat sink 74. The coolant duct in the heat sink 74 may be configured to be connected to the same external coolant circuit as the coolant duct 73 according to the first version A in the second exemplary embodiment of the present invention.

In addition, as illustrated in FIG. 6, the battery system 100 further includes a housing 75 for accommodating the battery module 90, i.e., the battery cells 80, therein. According to the illustrated exemplary embodiment, the battery system cover 60 has a structure that seals an opening formed at an upper portion of the housing 75 so as to form a portion of the housing 75. The housing 75 further includes a base plate connected to a sidewall of the housing. Each of two sidewalls of the housing 75 facing each other includes an exhaust port 76 for discharging the gas that is ejected from the vent holes 34 and deflected from the at least one ridge portion 70.

DESCRIPTION OF SYMBOLS

60: battery system cover 70: ridge portion
71: first ridge side portion 72: second ridge side portion
73: coolant duct 74: heat sink
75: housing member 76: exhaust port
80: battery cell tab 90: battery module

The invention claimed is:

1. A battery system comprising:
a plurality of aligned battery cells arranged along a first direction; and
a battery system cover for covering the plurality of aligned battery cells,
wherein each of the plurality of aligned battery cells comprises a battery case in which an electrode assembly is accommodated, a cap assembly disposed in the battery case, and a vent hole provided in the cap assembly,
wherein the battery system cover comprises at least one ridge portion disposed on a lower surface thereof facing the aligned battery cells,
wherein the at least one ridge portion extends along the first direction and is aligned with the vent holes of the aligned battery cells,
wherein the ridge portion is nearest to the battery cells at a center portion of the ridge portion and tapers away from the battery cells along a second direction that is substantially perpendicular to the first direction, and
wherein the ridge portion has a continuously decreasing thickness from the center portion of the ridge portion to each of the opposite distal ends of the ridge portion at where the ridge portion blends into the battery system cover to deflect a gas ejected from the vent holes to the second direction.

2. The battery system of claim 1, wherein
the vent holes of the aligned battery cells are aligned along the first direction.

3. The battery system of claim 1, wherein
the at least one ridge portion is spaced apart from the vent holes in a third direction that is substantially perpendicular to the first direction and the second direction.

4. The battery system of claim 1, wherein
the at least one ridge portion has a cross-section along the second direction that is inclined toward the battery cells.

5. The battery system of claim 1, wherein
each of the at least one ridge portion includes a first ridge side portion and a second ridge side portion,
the first ridge side portion is configured to deflect the gas ejected from the vent holes to the second direction, and
the second ridge side portion is configured to deflect the gas ejected from the vent holes to an opposite direction to the second direction.

6. The battery system of claim 1, wherein
the at least one ridge portion has a substantially triangular cross-section along the second direction.

7. The battery system of claim 5, wherein
each of the first ridge side portion and the second ridge side portion has a concave cross-section along the second direction.

8. The battery system of claim 1, wherein
the at least one ridge portion is configured to cool a gas ejected from the vent holes.

9. The battery system of claim 8, wherein
the ridge portion includes at least one coolant duct.

10. The battery system of claim 8, wherein
the at least one ridge portion and/or the battery system cover are formed of a material having high thermal conductivity, and
a heat sink is disposed on an upper surface of the battery system cover.

11. The battery system of claim 1, further comprising a plurality of battery modules disposed apart from each other along the second direction,
wherein each of the battery modules includes the plurality of battery cells arranged along the first direction, and
wherein the battery system cover includes a plurality of ridge portions spaced apart from each other along the second direction, each of which extends along the first direction and is aligned with the vent holes of the aligned battery cells.

12. The battery system of claim 1, wherein
each of the battery cells further includes a positive terminal and a negative terminal, and the vent hole is separately disposed between the positive terminal and the negative terminal.

13. The battery system of claim 12, wherein
the positive terminal and the negative terminal are spaced apart from each other along the second direction, and the vent hole is disposed between the positive terminal and the negative terminal.

14. The battery system of claim 1, further comprising a housing configured to house the battery cells,
wherein the battery system cover is configured to be attached to the housing.

15. The battery system of claim 14, wherein
at least one sidewall of the housing disposed along the second direction includes an exhaust port for discharging an exhaust gas that is ejected from the vent hole and deflected from the at least one ridge portion.

16. The battery system of claim 11, wherein the ridge portions are provided in one-to-one correspondence with the battery modules, and wherein the lower surface is free from obstructions between adjacent ones of the ridge portions.

* * * * *